US007578035B2

(12) United States Patent
Dold et al.

(10) Patent No.: US 7,578,035 B2
(45) Date of Patent: Aug. 25, 2009

(54) SUPPORT MEANS END CONNECTION FOR FASTENING AN END OF A SUPPORT MEANS IN AN ELEVATOR INSTALLATION, AN ELEVATOR INSTALLATION WITH A SUPPORT MEANS END CONNECTION, AND A METHOD FOR FASTENING AN END OF A SUPPORT MEANS IN AN ELEVATOR INSTALLATION

(75) Inventors: Florian Dold, Reussbühl (CH); Adolf Bissig, Buochs (CH); Manfred Wirth, Rotkreuz (CH); Claudio De Angelis, Münster (DE)

(73) Assignee: Inventio AG, Hergiswil NW (CH)

( * ) Notice: Subject to any disclaimer, the term of this patent is extended or adjusted under 35 U.S.C. 154(b) by 352 days.

(21) Appl. No.: 11/459,162

(22) Filed: Jul. 21, 2006

(65) Prior Publication Data

US 2007/0034454 A1 Feb. 15, 2007

(30) Foreign Application Priority Data

Jul. 22, 2005 (EP) .................................. 05106754

(51) Int. Cl.
*F16G 11/00* (2006.01)
*F16G 11/04* (2006.01)

(52) U.S. Cl. .................................................... 24/136 R

(58) Field of Classification Search ....................... None
See application file for complete search history.

(56) References Cited

U.S. PATENT DOCUMENTS

| | | | | |
|---|---|---|---|---|
| 3,660,887 | A | 5/1972 | Davis | |
| 4,279,531 | A | 7/1981 | McKenzie et al. | |
| 5,336,846 | A | 8/1994 | Sachs et al. | |
| 6,061,879 | A | 5/2000 | Ericson et al. | |
| 6,256,841 | B1 | 7/2001 | Ericson et al. | |
| 6,401,871 | B2 | 6/2002 | Baranda et al. | |
| 6,994,487 | B2 * | 2/2006 | Traktovenko et al. | 403/314 |
| 2003/0041419 | A1 | 3/2003 | Perez et al. | |

FOREIGN PATENT DOCUMENTS

| | | | |
|---|---|---|---|
| CN | 1211272 | C | 7/2005 |
| WO | WO 01/51400 | A1 | 7/2001 |

* cited by examiner

*Primary Examiner*—Jack W. Lavinder
(74) *Attorney, Agent, or Firm*—Fraser Clemens Martin & Miller LLC; William J. Clemens

(57) ABSTRACT

In an elevator installation, an apparatus and a method use a support end connection for fastening a support device to an elevator car, a counterweight and/or a building. The support device has at least one cable or cable strand enclosed by a cable casing and is held in a wedge pocket by a wedge. The cable casing is formed of thermoplastic material or an elastomer and the cable or the cable strand is glued to, fused together with or mechanically connected with the cable casing in the region of the support end connection. A friction force transmitted from the support end connection to the cable casing can then be directly passed on to the load-bearing core of the support device, to the cables or to the cable strands. The tolerable tension force in the support device is increased. The support device is preferably a multiple cable.

16 Claims, 7 Drawing Sheets

SUPPORT MEANS END CONNECTION FOR FASTENING AN END OF A SUPPORT MEANS IN AN ELEVATOR INSTALLATION, AN ELEVATOR INSTALLATION WITH A SUPPORT MEANS END CONNECTION, AND A METHOD FOR FASTENING AN END OF A SUPPORT MEANS IN AN ELEVATOR INSTALLATION

BACKGROUND OF THE INVENTION

The present invention relates to a support means end connection for fastening an end of a support means in an elevator installation, an elevator installation with support means end connection and method for fastening an end of a support means in an elevator installation.

An elevator installation usually consists of a car and a counterweight which are moved in opposite sense in an elevator shaft. The car and the counterweight are connected together and supported by means of a support means. An end of the support means is in that case fastened by a support means end connection to the car or the counterweight or in the elevator shaft. The support means end connection accordingly has to transmit the force, which acts in the support means, to the car or the counterweight or to the elevator shaft. It has to be designed in such a manner that it can securely transmit a required supporting force of the support means. Currently, increasing use is made of support means in which several cables or cable strands are combined to form a support means. The support means in that case consists of at least two cables or cable strands extending at a spacing from one another and a common cable casing. The cables or cable strands then substantially serve for transmission of supporting and movement forces and the cable casing protects the cables or cable strands from external influences and improves the transmission capability of drive forces introduced into the support means by drive engines.

In known embodiments of support means end connections the support means is fixed in a wedge pocket by means of a wedge.

A support means end connection for a support means provided with an elastomeric sheathing is known from patent publication WO 00/40497. The elastomeric sheathing sheaths and/or separates the individual cables or cable strands and it defines a force transmission surface relative to the drive engine. In this support means end connection a wedge angle shall be selected in such a manner that the pressure loading, which is produced by the wedge for a given length and width, on the support means produces lower values than the permissible pressure loading of the elastomeric sheathing.

In this construction a proposal is indeed made for force introduction from the support means end connection to the cable casing of the support means, but the transmission of the force from the casing to the actual supporting cable or cable strands is not solved. The coefficients of friction within a cable strand or a cable are in many cases smaller than from the cable casing to the connecting parts. This has the consequence that a cable strand or a cable is held only insufficiently within the cable casing, whereby the permissible load-bearing force of the support means is limited.

SUMMARY OF THE INVENTION

An object of the present invention is to provide an optimized support means end connection which maximally and reliably transmits the load-bearing force of the support means. This has the advantage that an economic elevator installation can be provided. The force introduction as far as to the supporting cables or cable strands can be ensured, the overall stresses in the support means can be optimized and a long service life of the support means can be achieved. Moreover, the support means can be constructed to be resistant to increased environmental temperatures and it can be mounted in simple manner.

The present invention relates to a support means end connection for fastening a support means end in an elevator installation and to a method of fastening a support means in an elevator installation.

The elevator installation consists of a car and a counterweight, which are moved in opposite sense in an elevator shaft. The car and the counterweight are connected together and supported by way of the support means. The support means consists of at least one cable or cable strand and a cable casing which encloses the cable or the cable strand. The cable or cable strand is produced from synthetic fibers, which can be impregnated, or from metallic material, preferably steel wires. Several of these support means together form a support means stretch.

An end of the support means is fastened by a support means end connection to the car or the counterweight or in the elevator shaft. The support means is held in the support means end connection by means of a wedge, which fixes the support means in a wedge pocket. The part of the support means end connection containing the wedge pocket is formed by a wedge housing. The support means has a loose run at its unloaded end. This loose run runs up on a wedge pocket adhesion surface inclined relative to the vertical direction and is there pressed by the wedge, by means of its wedge adhesion surface, onto the wedge pocket adhesion surface. The support means is further guided around a wedge curve and runs between an opposite wedge slide surface and the wedge pocket slide surface, which is oriented substantially vertically or in tension direction of the support means, to the supporting run of the support means. The support means loops around the wedge. The tension force of the support means is thus applied by pressing along the wedge and the wedge-pocket surfaces and the looping around of the wedge. The support means is held by means of the wedge in the wedge pocket and the support means extends between wedge and wedge pocket.

A tolerable tension force of the support means is in that case decisively influenced by the form of the mutually contacting surfaces and the kind of the force flow from the support means end connection to the casing and the cables or cable strands.

According to the present invention the cable or the cable strand is glued to, fused together with or mechanically connected with the cable casing in the region of the support means end connection. The gluing, fusing together or mechanical connection of the cable or cable strands with one another and with the cable casing has the effect that no relative movement within the support means can take place. A friction force which is transmitted from the surfaces of the wedge pocket or the wedge to the cable casing is passed on directly in the load-bearing core of the support means to the cables or the cable strands. The tolerable tension force in the support means is increased.

A gluing takes place, for example, in that a predefined quantity of low-viscosity liquid adhesive is dripped or cast into the individual cables or cable strands at the end of the support means. The adhesive soaks in, due to gravitational force and capillary action, between cable or cable strand and casing and permanently connects these parts. In the case of impregnated cables or cable strands the adhesive also bonds with, in particular, the impregnating medium, for example polyurethane. This gluing forms an economic method for producing a cable means end fastening.

A fusing together can be carried out in that a punctiform fusing together of the casing material with the cables or the cable strands is effected by way of a heat source from outside or by way of an ultrasound source. Particularly advantageous is fusing together with use of like materials, such as, for example, polyurethane, for the cable strand impregnation and for the casing.

A mechanical connection is carried out in that, for example, a pin is introduced into the end of the cable or the cable strand, whereby the local pressing forces increase. The use of a wood screw or a screw-in pin, which runs out to a point, screwed into an end of the support means or the cable or cable strands thereof is particularly advantageous.

This embodiment is particularly optimal in costs and the wood screw produces an increase in the tolerable take-off force in a double respect. On the one hand the local pressing force is increased and on the other hand the wood screw head is exposed at the housing or the wedge in the case of possible slipping. This increases the tolerable take-off force.

A further mechanical connection can also be achieved by knotting or braiding the ends of the cable strands or cables of the support means. This connection it is preferably used for cables or cable strand ends which are thin and correspondingly soft in bending.

The illustrated solutions are particularly advantageous in the case of cables or cable strands of synthetic fibers. Synthetic fibers usually have more favorable adhesion characteristics. A tolerable take-off force can be increased with use of the illustrated invention. The cable casing preferably substantially consists of thermoplastic synthetic material or elastomer.

An advantageous embodiment proposes that a wedge adhesion surface or wedge pocket adhesion surface, which lies closer to the loose run of the support means, is provided with a longitudinal wedge flute or groove. This is particularly advantageous, since in the case of loading of the support means the pressing force, which arises through drawing-in of the wedge, of the wedge on the wedge pocket increases to particular extent the possible retaining force in the support means on the side of the wedge pocket adhesion surface and presses the cable or the cable strand together and with the cable casing—since this surface has longitudinal wedge flutes—whereby the maximum possible support means force increases as a consequence of the deflection around the wedge curve. The force is in that case continuously increased, since the force increase is further built up on the side of the loose run. In addition, the wedge flute can be formed over the curve of the wedge.

In a further embodiment the wedge pocket adhesion surface and/or wedge adhesion surface, which lies closer to the loose run of the support means, is provided with a surface roughness increased relative to the rest of the surface of the wedge pocket or the wedge or these surfaces are provided with transverse flutes or transverse grooves. This is advantageous, since in the case of loading of the support means the pressing force, which arises through the drawing-in of the wedge, of the wedge on the wedge pocket increases to particular extent the possible load-bearing force in the support means on the side of the wedge pocket adhesion surface or wedge adhesion surface—since this surface has an increased roughness or transverse flutes or transverse grooves—whereby the maximum possible support means force increases as a consequence of the deflection around the wedge curve. The force is in that case continuously increased, since the initial force on the side of the loose run is built up. The loose run of the support means is securely held and a high load-bearing force can be transmitted. In addition, the wedge pocket slide surface on which the support means slides during the loading process is formed with a correspondingly lesser roughness, which counteracts damage of the support means, since the surface thereof is not harmed. An economic support means end connection with high support load can be provided by means of this invention.

Alternatively or additionally a wedge slide surface and/or wedge pocket slide surface, which lies closer to the supporting run of the support means, is provided with measures reducing the coefficient of friction. Measures reducing the coefficient of friction are, for example, a slide spray, an intermediate layer of synthetic material capable of sliding or a surface coating. This enables sliding of the support means during the loading process, which counteracts damage of the support means on the side of the support means end connection loaded in tension, since this surface is not harmed and a loading in the casing and in the cable or cable strand takes place uniformly. An economic support means end connection with high support load can be provided by means of this embodiment.

In another form of embodiment a wedge slide surface or wedge pocket slide surface, which lies closer to the supporting run of the support means, has a first and a second surface region, wherein the first surface region is arranged in the zone of exit of the support means from the support means end fastening and this first surface region has a larger wedge angle than the second surface region, which adjoins the first surface region and which forms the transition to a further surface region or to the upper end of the wedge pocket surface or the wedge surface. The first surface region is increasingly spaced from the corresponding counter surface in direction towards the wedge end at the exit side. Advantageously the transitions between the individual surface regions are formed to be continuous. In an optimized embodiment the surface regions are formed in such a manner that a transition from the first to the nth surface region run continuously, i.e. in correspondence with a transition contour, wherein the nth surface region determines the main pressing region.

These solutions effect a continuous decrease in the pressing force of the support means over a definable exit stretch of the support means from the support means end connection. Advantageously, this surface region extends over less than 50% of the entire wedge slide surface or wedge pocket slide surface. The support means does not experience any abrupt load transitions. This increases the service life of the support system.

Moreover, the ends, which are at the tension cable side, of the wedge slide surface and the wedge pocket slide surface are advantageously provided with radii or formed to be curved. The use of a radius or curved transitions has the effect that a pressing force of the support means is built up gradually. No abrupt stress changes are forced and a sliding of the support means in the highly-loaded tension zone of the support means is made possible without damage of the support means.

Alternatively, the wedge is formed to be resilient at its wedge-shaped end. This leads to a slow reduction in the pressing force of the support means. In addition, the support means thereby does not experience any abrupt load transitions. This increases the service life of the support system.

In a further embodiment the wedge adhesion surface of the loose run is connected with the wedge slide surface of the supporting run at the upper end of the wedge by means of the wedge curve and this wedge curve tangentially adjoins the wedge surfaces which are at both sides, wherein in the embodiment according to the invention the radius of curvature of the curve is smaller towards the wedge adhesion surface of the loose run. A smaller radius of curvature produces a greater curvature of the support means and thereby indicates greater deformation stresses in the support means itself. Conversely, at the same time the tension force acting in the support means reduces towards the loose run in correspondence with the looping law of Eytelwein, which causes decreasing tension stresses in the support means. Increasing deformation stresses thus oppose decreasing tension stresses and in the ideal case compensate for one another. This produces an optimization of the overall stress in the support means and prolongs the service life of the support means overall.

An advantageous support means end connection of the illustrated kind arises through use of a support means in the form of a multiple cable. The support means in that case consists of at least two cables or cable strands extending at a spacing from one another and the cable casing encloses the cable or cable strand composite and separates the individual cables or cable strands from one another. The support means then has a longitudinal structure, preferably longitudinal flutes or grooves.

The longitudinal structure can be an image of an individual cable or cable strand or a group of cables or cable strands can be fitted into a longitudinal structure. The cable casing can in that case be specially profiled according to the respectively desired groove structure. A possible construction of the cable pocket or the cable is preferably oriented towards the kind of longitudinal structure. This enables provision of a particularly economic support means end connection.

Advantageously, each cable or cable strand run is clamped by means of an associated longitudinal wedge groove of the wedge or wedge pocket.

This allows a particularly good force introduction of the support means force into the support means end connection.

In addition, an end of the illustrated support means or the multiple cable is divided up into individual cable or cable strand runs and each cable or cable strand run is clamped by means of an associated longitudinal wedge flute of the wedge or wedge pocket. The separation of the support means into individual cable or cable strand runs can be carried out manually, for example by cutting or tearing, or it can be carried out forcibly by a center web which arises through the formation of the longitudinal grooves on the wedge surface or wedge pocket surface.

DESCRIPTION OF THE DRAWINGS

The above, as well as other, advantages of the present invention will become readily apparent to those skilled in the art from the following detailed description of a preferred embodiment when considered in the light of the accompanying drawings in which.

Figure 8:
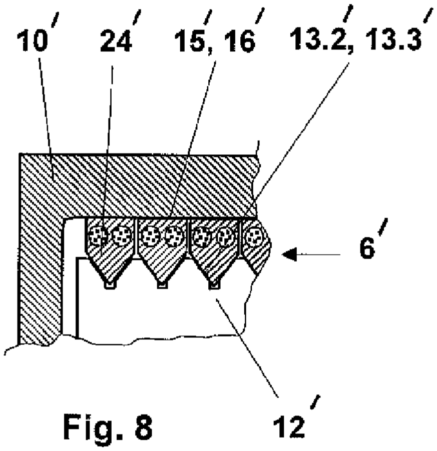
Figure 9:
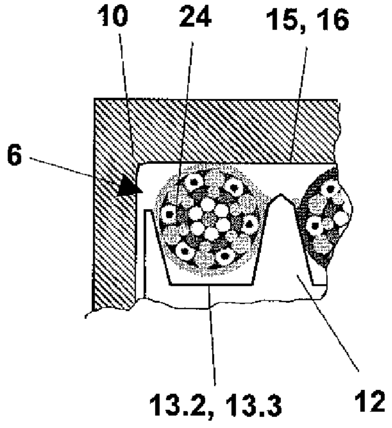
Figure 10:
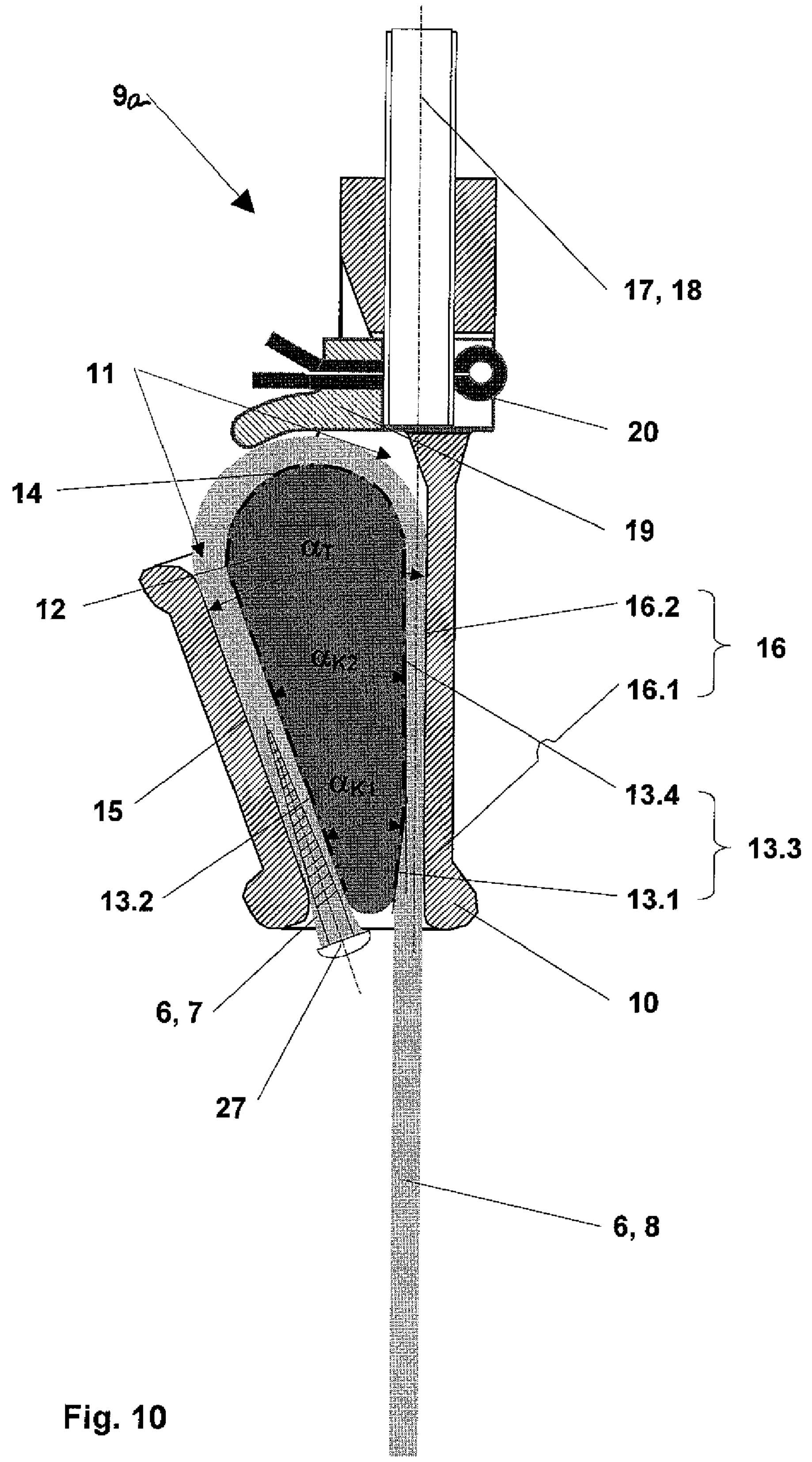
Figure 11:
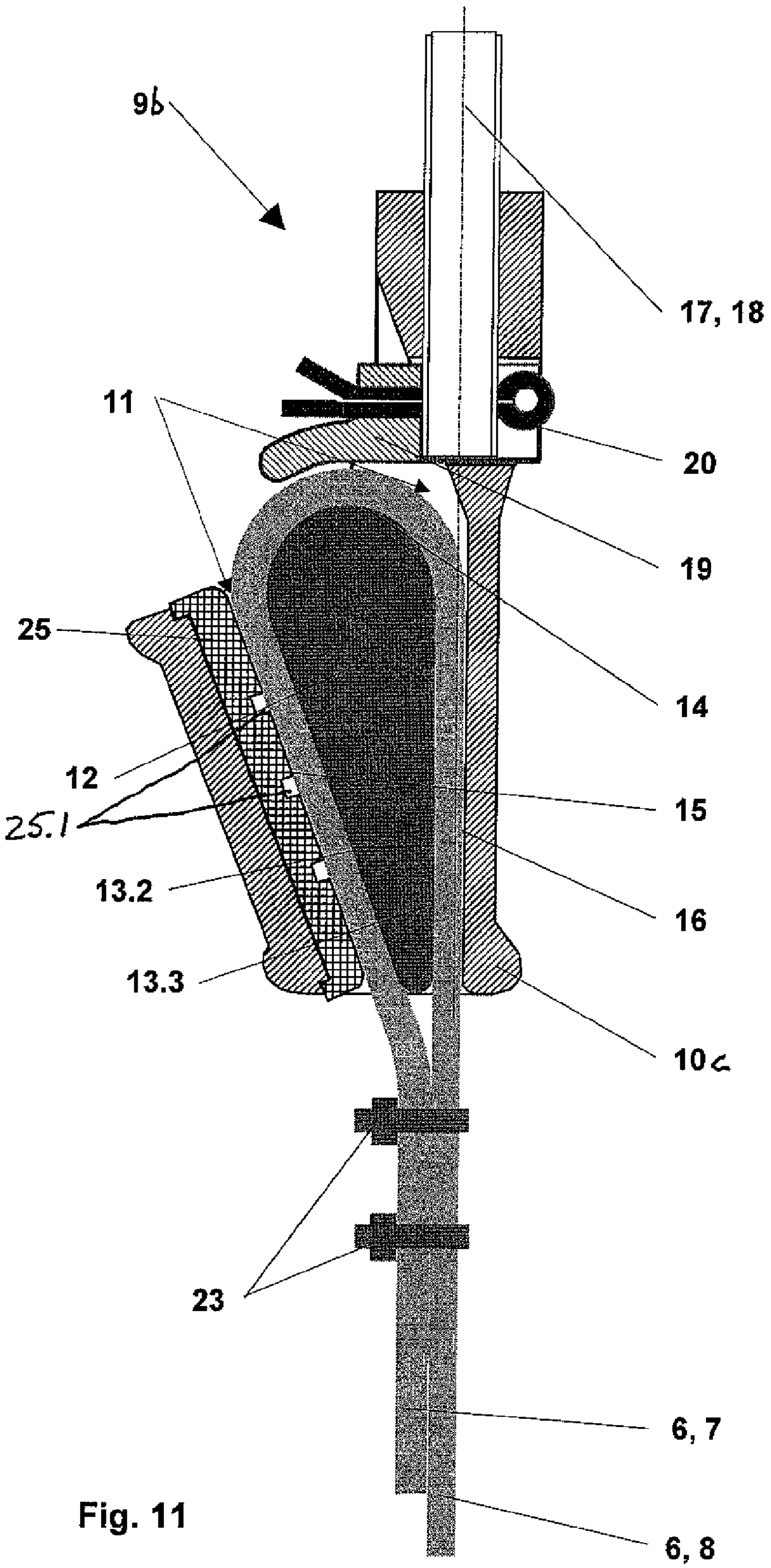
Figure 12:
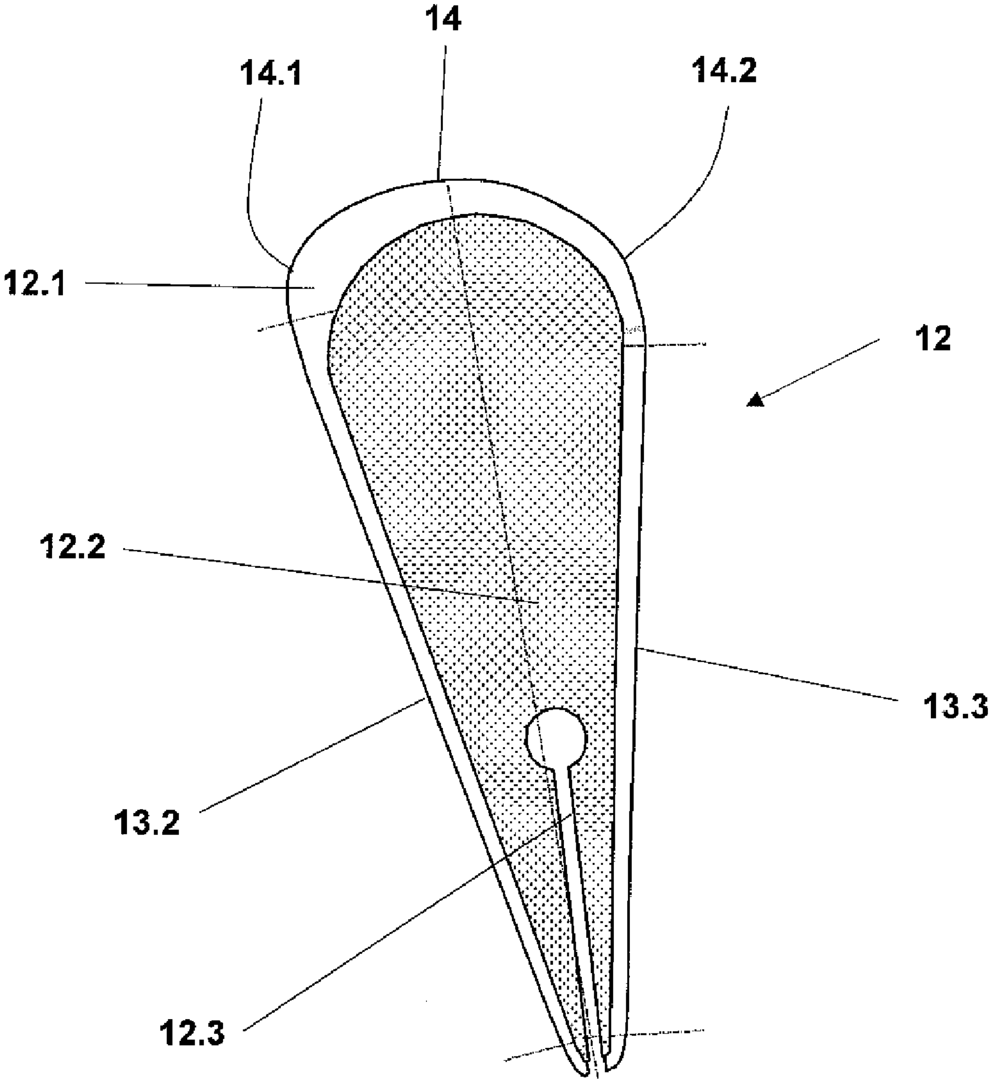

FIG. **7*a*** is a schematic illustration of the introduction of adhesive into an end of the support means;

FIG. 8 is a fragmentary cross-sectional view of the support means end fastening with longitudinal wedge grooves, which are arranged at the wedge, and the belt-shaped support means divided up into individual strands;

FIG. **8*a*** a fragmentary cross-sectional view of the support means end fastening with longitudinal wedge grooves, which are arranged at the wedge pocket, and the belt-shaped support means divided up into individual strands;

FIG. **8*c*** is a fragmentary cross-sectional view of the support means end fastening with longitudinal wedge grooves, which are arranged at the wedge pocket, and the belt-shaped support means with a fused casing;

FIG. 9 is a fragmentary cross-sectional view of the support means end fastening with longitudinal wedge grooves, which are arranged at the wedge, and the support means divided up into individual strands;

FIG. **9*a*** is a fragmentary cross-sectional view of the support means end fastening with longitudinal wedge grooves, which are arranged at the wedge pocket, and the support means divided up into individual strands;

FIG. 10 is a fragmentary cross-sectional view of an alternate embodiment support means end connection with several wedge sliding surface regions and a mechanically connected support means end;

FIG. 11 is a view similar to FIG. 10 of another alternate embodiment support means end connection with insert plate; and FIG. 12 is a cross-sectional view of a wedge for the support means end connection, with resiliently constructed tapering and coated surface as well as variable radius at the wedge curve.

DESCRIPTION OF THE PREFERRED EMBODIMENT

Figure 1:
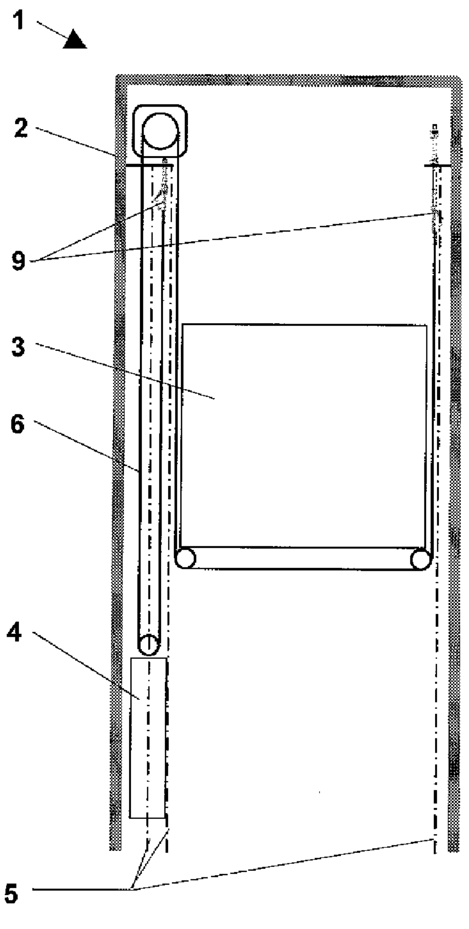
FIG. 1 is a schematic elevation view of an elevator installation, with lower looping, with a support means end fastening according to the present invention fixed in the elevator shaft.
Figure 2:
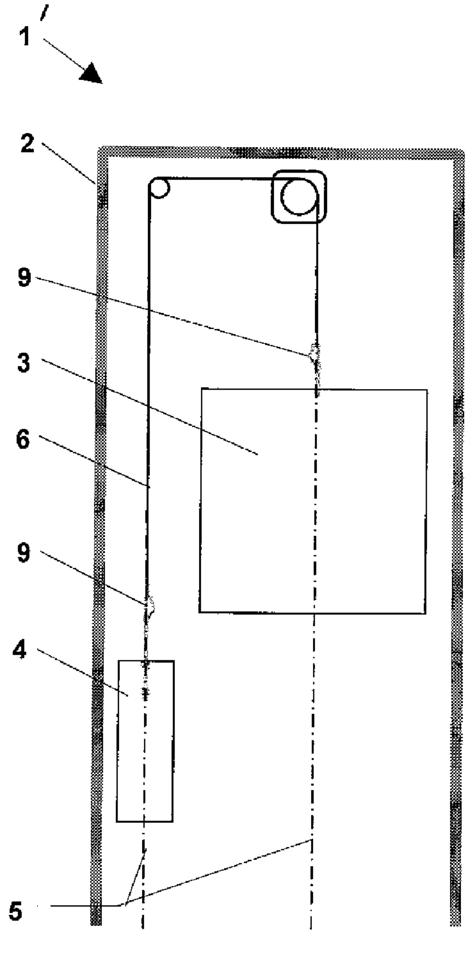
FIG. 2 is a schematic elevation view of an elevator installation, suspended directly, with the support means end fastening according to the present invention fastened to a car and a counterweight.

An elevator installation consists, as illustrated in FIGS. 1 and 2, of a car 3 and a counterweight 4, which are moved in opposite sense in an elevator shaft 2. The car 3 and the counterweight 4 are connected together and supported by way of a support means or device 6. An end of the support means 6 is fastened by a support means end connection 9 to the car 3 or the counterweight 4, according to FIG. 2, or in the elevator shaft 2, according to FIG. 1. The location of the fastening is oriented towards the mode of construction of the elevator installation. FIG. 1 shows this connection for an elevator installation 1 suspended 2:1 and FIG. 2 shows this connection for an elevator installation 1' suspended 1:1. Axes 5 represent the direction of the loads imposed on the connections 9 by the car 3 and the counterweight 4.

Figure 3:
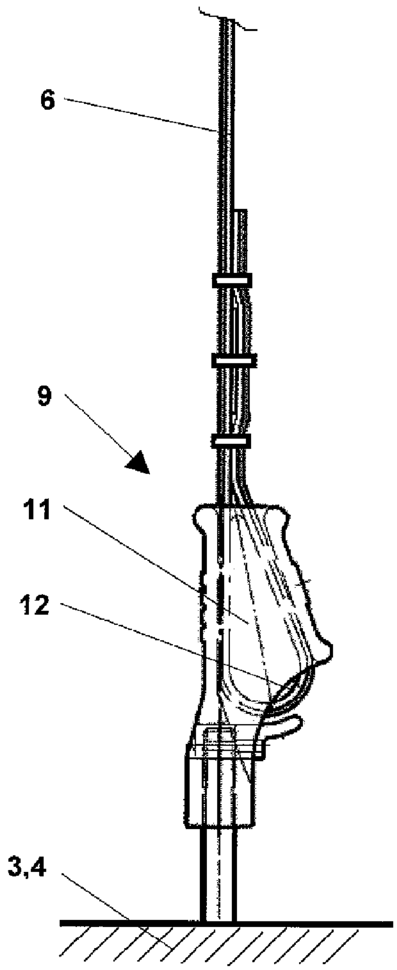
FIG. 3 is an enlarged view of the support end means fastening shown in FIG. 2 with a take-off force acting upwardly.
Figure 4:
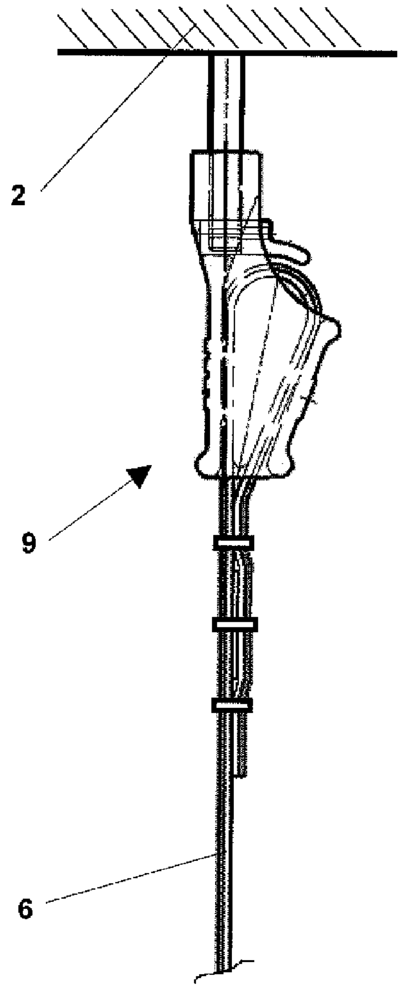
FIG. 4 is an enlarged view of the support means end fastening shown in FIG. 1 with a downwardly acting take-off force.

In FIGS. 3 and 4 it is apparent how the support means 6 is held in the support means end connection 9 by means of a wedge 12, which fixes the support means in a wedge pocket 11. The support means end fastening 9 can be mounted in various installation positions. In FIG. 3 the take-off direction is directed upwardly. In FIG. 4 the take-off direction is directed downwardly, as is usually used in the case of an elevator installation with looped-around suspension according to FIG. 1.

Figure 5:
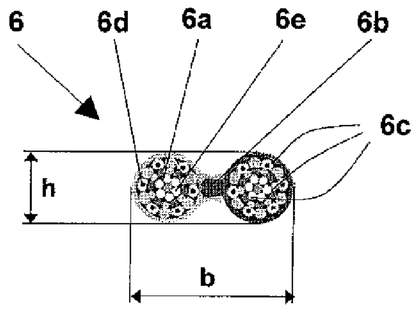
FIG. 5 is a cross-sectional view the support means shown in FIGS. 1-4 with spaced-apart cables.

FIG. 5 shows the support means 6 in the form of a "twin rope". In this connection, individual strands 6*c*, which in the illustrated example are made of synthetic fibers, are stranded to form a multi-layer cable 6*a*. The cable 6*a* is enclosed by a thermoplastic or an elastomeric cable casing 6*b*. An outer cable strand collar 6*d* in this connection is flush with and connected over an area with the casing 6*b*. In order to obtain a flexible cable the inner cable strand collar 6*c* is connected merely by the stranding. In the illustrated example, two cables 6*a* of that kind are arranged at a spacing from one another and comprise the common thermoplastic or elastomeric cable casing 6*b*.

Figure 6:
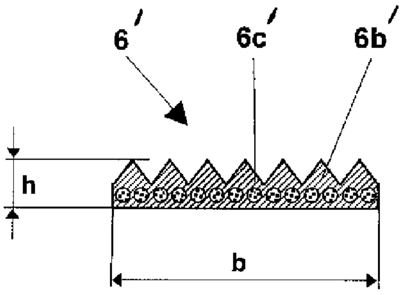
FIG. 6 is a cross-sectional of an alternate support means with spaced-apart cable strands.

FIG. 6 shows an alternate embodiment support means 6' in the form of a wedge-ribbed belt in which several cable strands 6*c*' are surrounded by a thermoplastic or an elastomeric casing 6*b*', wherein the wedge ribs form the profiling required for generating a drive capability. In each instance a double run of the cable strands 6*c*' is associated in the illustrated example with one rib.

The cable 6*a* and the cable strand 6*a*' run are one of glued, fused or mechanically connected with the cable casing 6*b*, 6*b*', respectively, in the region of the support means end connection 9.

Figure 7:
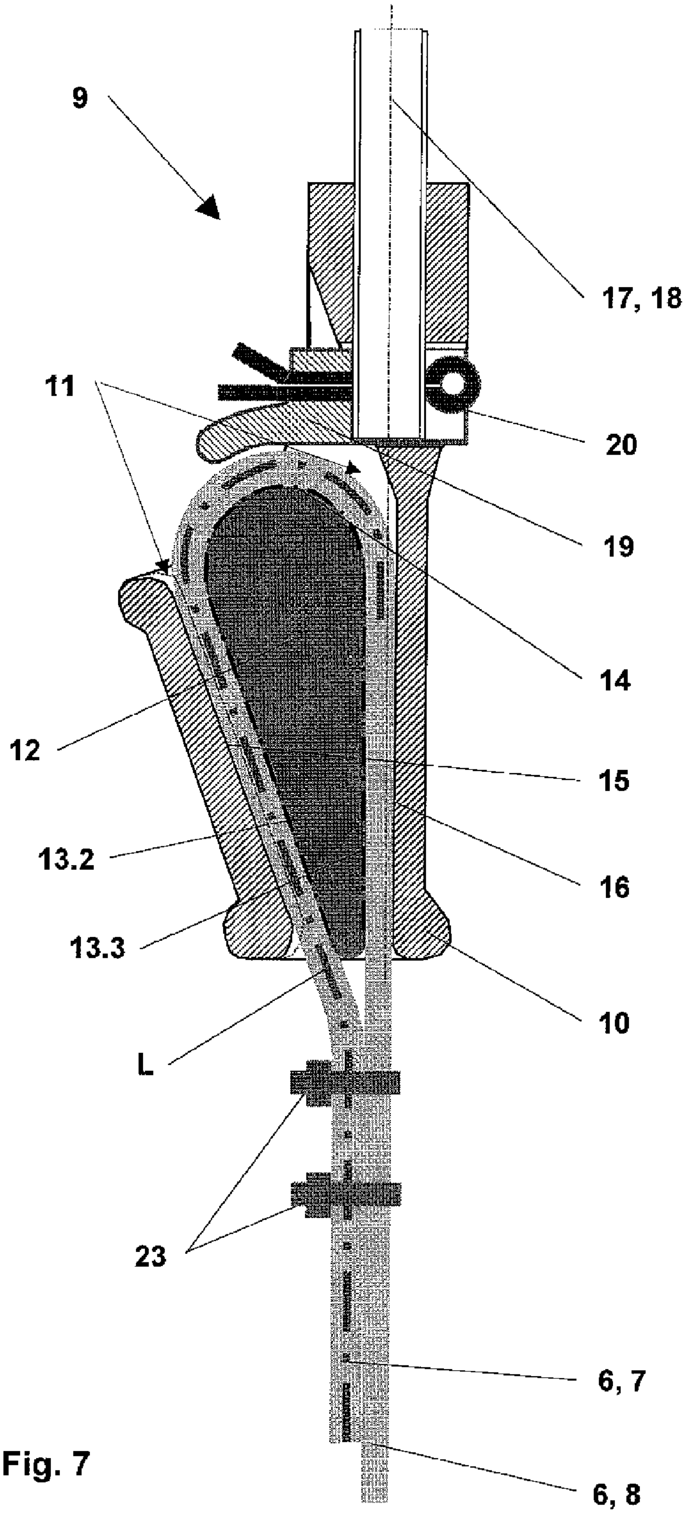
FIG. 7 is a cross-sectional view of the support means end connection shown in FIGS. 1-4.

FIG. 7 shows the basic construction of the support means end connection 9. An end of the support means 6 (or 6') is fastened by the support means end connection 9 to the car or counterweight or in the elevator shaft. The support means 6 is held in the support means end connection 9 by means of the wedge 12 which fixes the support means 6 in the wedge pocket 11. The part of the support means end connection 9 containing the wedge pocket 11 is formed by a wedge housing 10. The support means 6 has a loose run 7 at its unloaded end. This loose run 7 runs onto a wedge pocket adhesion surface 15 inclined relative to the vertical direction and is pressed there onto the wedge pocket adhesion surface 15 by the wedge 12 by means of an adhesion surface 13.2. The support means 6 is further led around a wedge curve 14 and runs between an opposite wedge sliding surface 13.3 and wedge pocket sliding surface 16, which is advantageously oriented vertically or in the tension direction of the support means 6, to a supporting run 8 of the support means 6. The tensile force of the support means 6 is thus applied by the pressing along the wedge and wedge pocket surfaces 13.2, 13.3, 15, 16 and the looping around of the wedge curve 14. The support means 6 is held in the wedge pocket 11 by means of the wedge 12 and the support means 6 runs between the wedge 12 and the wedge pocket 11.

A tolerable tensile force of the support means is in that case decisively influenced by the design of the contacting surfaces in the form of force flow from the support means end connection 9 to the casing of the cable 6 or of the cable strands.

In the illustrated example the wedge 12 is connected with an attachment point by means of a tie rod 17, 18. Moreover, the wedge 12 is secured, against slipping out, by way of means 19 securing against loss and a split-pin 20 and the loose run 7 is fixed to the supporting run 8 by means of plastic ties 23.

Figure 7A:
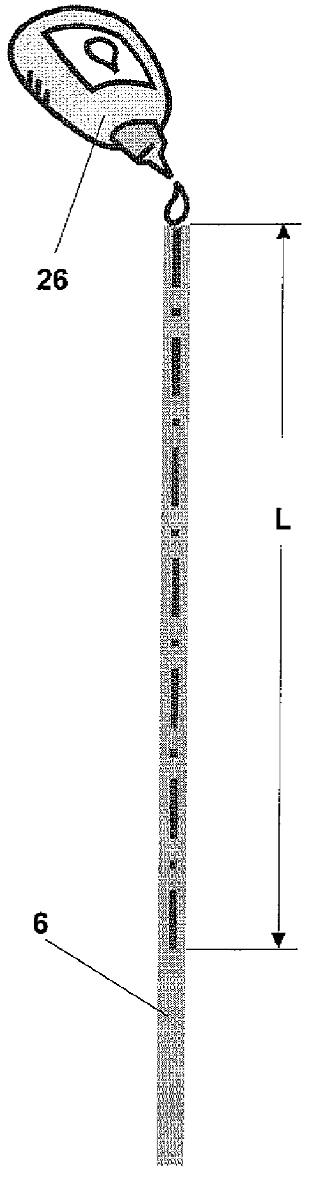

FIG. 7*a* illustrates a gluing process. A defined quantity of liquid adhesive 26 is dripped into an end of the support means 6. The cable 6*a* or the cable strands 6*c* draws or draw in the liquid adhesive 26 substantially through capillary action. The dripping in is repeated until a predetermined quantity of the liquid adhesive is introduced. This quantity is usually determined experimentally in a model support means. Advantageously the adhesive quantity is determined in such a manner that a penetration length L results which embraces the region of the wedge adhesive surface 13.2, the region of the wedge curve 14 and a part of the wedge slide surface 13.3.

FIGS. 8, 8*a*, 8*c*, 9 and 9*a* show advantageous alternative embodiments of the wedge pocket surface and the wedge surface.

In FIG. 8 the wedge pocket surface 15', 16' of the housing 10' is formed to be substantially smooth and the wedge surface 13.2', 13.3' is provided with longitudinal wedge grooves. The longitudinal wedge grooves are formed in correspondence with a profiling of the support means 6'. The support means 6' is divided up in the region of the longitudinal wedge grooves of the wedge 12' into individual support means runs 24'. In the illustrated example, in each instance two of the cable strands 6*c*' are associated with a respective one of the support means runs 24'. The support means 6' is effectively pressed by the groove pressing and a holding force can thereby be transmitted to the cable strands by way of the casing of the support means.

Figure 8A:
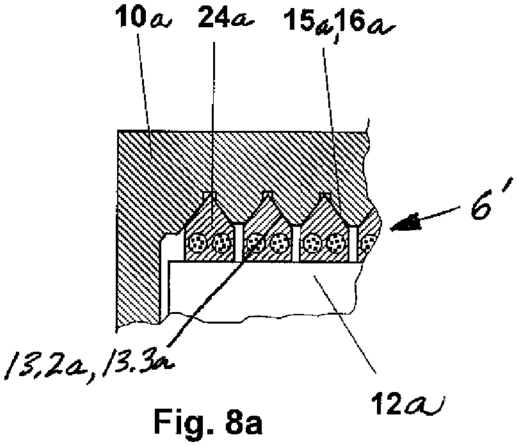
Figure 8C:
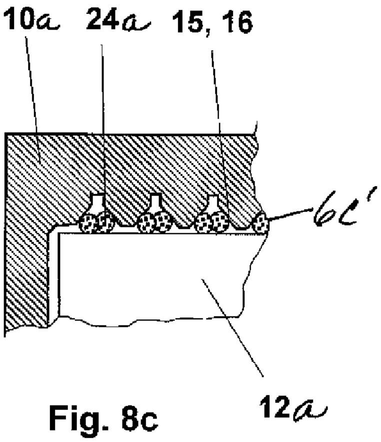

FIG. 8*a* shows a similar solution in which, however, the wedge pocket surface 15*a*, 16*a* of the housing 10*a* is provided with longitudinal wedge grooves and the wedge surface 13.2*a*, 13.3*a* is formed to be substantially smooth. The longitudinal wedge groove is advantageously arranged at the wedge pocket adhesion surface 15*a*. An optimum adhesion of the support means in the case of the loose run 7 of the support means 6' thereby results. With particular advantage, in the case of this solution, as illustrated in FIG. 8*c*, it has proved that cable strands 6*c*' of the support means 6' can be clamped even when the cable casing 6*b*' melts due to, for example, the action of fire.

In FIG. 9 the wedge pocket surface 15, 16 of the housing 10 is formed to be substantially smooth and the wedge surface 13.2, 13.3 is provided with longitudinal wedge grooves. The longitudinal wedge grooves are formed similarly to the wedge groove of a traction pulley. The support means 6 is divided up in the region of the longitudinal wedge grooves of the wedge 12 into individual support means runs 24. In the illustrated example a respective one of the cables 6*a* is associated with each individual support means strand 24. The support means 6 is effectively pressed by the groove pressing and a holding force can thereby be transmitted to the cable strands by way of the casing of the support means.

Figure 9A:
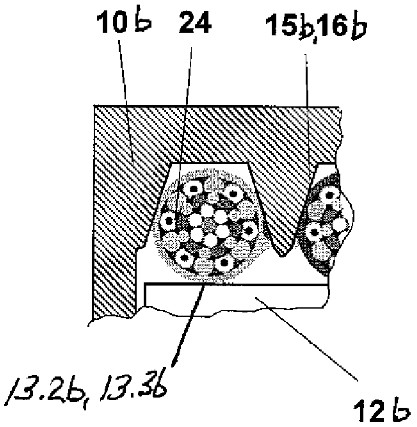

FIG. 9*a* shows a similar solution in which, however, the wedge pocket surface 15*b*, 16*b* of the housing 10*b* is provided with longitudinal wedge grooves and the wedge surface 13.2*b*, 13.3*b* is formed to be substantially smooth. The longitudinal wedge groove is advantageously arranged at the wedge pocket surface 15*b*. An optimum adhesion of the support means in the case of the loose run 7 of the support means 6 thereby results.

FIG. 10 shows another example of a constructed support means end connection 9*a*. The support means 6 is divided up at its end, as shown in FIG. 9, into individual support means runs 24. The cable is mechanically connected at its end, or at the end of the loose run 7, with use of a pin 27, for example a wood screw, with the cable casing. On tightening of the screw 27 in the end of the support means run 24 a crushing of the end fibers of the cable is effected. The pressing force exerted by the wedge 12 is thereby increased and the force transmission from the cable core to the casing is increased. Moreover, the screw head prevents tearing out of the support means in that it protrudes at the wedge 12 or at the housing 10. This additionally increases the maximum accessible tensile force in the support means.

The wedge 12 used in FIG. 10 has, additionally to the wedge sliding surface closer to the supporting run 8 of the support means 6, a first surface region 13.1 and a second surface region 13.4, wherein the first surface region 13.1 is arranged at the zone of departure of the support means 6 from the support means end fastening 9*a* and this first surface region 13.1 has a greater wedge angle $\alpha_{k1}$ than a wedge angle $\alpha_{k2}$ of the second surface region 13.4, which adjoins the first surface region 13.1 and which, in this example, forms the upper edge of the wedge surface 13.3. Many designs of this wedge shape are obviously possible. The first surface region 13.1 is thereby increasingly spaced from the associated counter-surface 16 in a direction towards the wedge end at the exit side. Obviously, many designs of this wedge shape are possible. Several or many part surface regions can be arranged adjacent to one another or indefinitely small surface regions can be used, whereby a continuous curve results. In addition, the illustrated support means end connection has the means 19 securing against loss, which secures the wedge 12 in the wedge pocket 11.

Alternatively or additionally the wedge pocket slide surface 16 correspondingly has a first surface region 16.1 and a second surface region 16.2. In addition, in this connection the first surface region 16.1 is constructed in such a manner that it is spaced from the corresponding wedge slide surface in a direction towards the wedge end at the exit side.

FIG. 11 shows a support means end connection 9*b* in which the wedge pocket surface 15 is formed by means of an insert part or plate 25. This is advantageous, since the housing 10*c* can be used for different support means in that merely the insert plates are varied. The surface 15 of the part or plate 25 can have a plurality of transverse flutes or grooves 25.1 formed therein that increase the adhesion force in the region of the wedge pocket adhesion surface 15, or the flutes or grooves 25.1 can be formed in the surfaces 15 shown in FIGS. 7 and 10.

FIG. 12 shows an advantageous construction of the wedge 12. The wedge 12 has a wedge core 12.2 made of, for example, steel. The wedge core 12.2 has an incision 12.3 at its lower end. The incision 12.3 has the effect that the lower end region of the wedge 12 is resilient. The lower region of the wedge surface 13.3 is thus formed to be resilient and a pressing, which is produced by the wedge, reduces in the direction of the lower end of the wedge 12. The wedge core 12.2 has a coating 12.1, which defines the wedge surfaces disposed in contact with the support means 6 (not illustrated). The coating 12.1 is advantageously of a plastics-like material capable of sliding. The coating 12.1 is, for example, formed according to the requirement of the support means contour. The wedge curve 14 is divided up into several radius sections. A first radius section 14.1 adjoins, in the illustrated example, the wedge adhesion surface 13.2. The radius section 14.1 has a small radius which towards the wedge sliding surface 13.3 adjoins an enlarging radius section 14.2.

The illustrated examples are examples of various embodiments of the present invention. The different embodiments can be combined. Thus, the insert part or plate 25 illustrated in FIG. 11 can be combined with wedge constructions according to FIG. 10 or 12, the insert plate can be coated or the insert plate can also be arranged on the side of the supporting run 8. Obviously, with knowledge of the present invention the shapes and arrangements employed can be changed as desired. Thus, for example, the support means end connection can also be used in a horizontal position of installation.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A support means end connection for fastening a support means in an elevator installation, the support means end connection comprising:

a support means;

a wedge pocket; and a wedge, wherein the support means includes a cable or cable strands and a cable casing enclosing the cable or the cable strands, wherein the support means is held by the wedge in the wedge pocket and an end section of the support means loops within the wedge pocket around the wedge, and wherein, over a penetration length of the end section of the support means, the cable or the cable strands being glued to the cable casing to firmly secure the cable or the cable strands to the cable casing.

2. The support means end connection according to claim 1 wherein a low-viscosity adhesive with a low surface tension is used for the gluing.

3. The support means end connection according to claim 1 wherein the support means has a loose run and at least one of a wedge adhesion surface and a wedge pocket adhesion surface disposed closer to said loose run has a longitudinal wedge groove formed therein.

4. The support means end connection according to claim 1 wherein the support means has a loose run and at least one of a wedge adhesion surface and a wedge pocket adhesion surface disposed closer to said loose run has a surface roughness increased relative to a rest of a surface of the wedge pocket.

5. The support means end connection according to claim 1 wherein the support means has a loose run and at least one of a wedge adhesion surface and a wedge pocket adhesion surface disposed closer to said loose run have transverse grooves formed therein.

6. The support means end connection according to claim 1 wherein the support means has a supporting run and at least one of a wedge slide surface and a wedge pocket slide surface disposed closer to said supporting run have a reduced coefficient of friction.

7. The support means end connection according to claim 1 wherein the support means has a supporting run and at least one of a wedge slide surface and wedge pocket slide surface disposed closer to said supporting run has a first surface region and a second surface region, said first surface region being increasingly spaced from an associated counter-surface in direction towards a wedge end exit side.

8. The support means end connection according to claim 1 wherein the support means has a supporting run and at least one of a wedge slide surface and wedge pocket slide surface disposed closer to said supporting run has a first surface region and a second surface region, said first surface region being increasingly spaced from an associated counter-surface in direction towards a wedge end exit side.

9. The support means end connection according to claim 8 wherein the wedge has a resilient end.

10. The support means end connection according to claim 1 wherein the support means has a loose run and a supporting run and wherein a wedge adhesion surface adjacent said loose run is connected with a wedge slide surface adjacent said supporting run at an upper end of the wedge by a wedge curve that tangentially adjoins said wedge adhesion and slide surfaces, and a radius of curvature of said wedge curve reduces towards said wedge adhesion surface.

11. The support means end connection according to claim 1 wherein the support means includes at least two of the cable or the cable strands extending at a spacing from one another separated by the cable casing, and wherein the support means has a longitudinal groove formed therein.

12. The support means end connection according to claim 1 wherein the cable or a one of the cable strands is clamped by an associated longitudinal wedge groove formed in one of the wedge and the wedge pocket.

13. The support means end connection according to claim 1 wherein the cable or one of the cable strands is formed of at least one of synthetic fibers and metallic material.

14. The support means end connection according to claim 1 wherein the support means has at least one end connected to one of an elevator car, a counterweight and a building by the support means end connection.

15. A support means end connection for fastening a support means in an elevator installation, wherein the support means includes a cable or cable strands enclosed by a cable casing, the support means is held by a wedge in a wedge pocket and the support means loops around the wedge, comprising:

the cable or the cable strands being one of glued to, melted together with and mechanically connected with the cable casing in a region of the support means inserted into the wedge pocket; and the support means having a supporting run and at least one of a wedge slide surface and a wedge pocket slide surface disposed closer to said supporting run has a reduced coefficient of friction.

16. The support means end connection according to claim 15 wherein the mechanical connection of the cable or cable strands includes a pin inserted into an end of the cable or the cable strands.

* * * * *

UNITED STATES PATENT AND TRADEMARK OFFICE

CERTIFICATE OF CORRECTION

PATENT NO. : 7,578,035 B2
APPLICATION NO. : 11/459162
DATED : August 25, 2009
INVENTOR(S) : Dold et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 387 days.

Signed and Sealed this

Seventh Day of September, 2010

David J. Kappos
*Director of the United States Patent and Trademark Office*